(12) United States Patent
Andolfatto et al.

(10) Patent No.: US 6,194,338 B1
(45) Date of Patent: Feb. 27, 2001

(54) BIMETAL SUPPORTED CATALYST BASED ON PLATINUM OR SILVER, ITS MANUFACTURING PROCESS AND ITS USE FOR ELECTROCHEMICAL CELLS

(75) Inventors: Francoise Andolfatto; Sylvain Miachon, both of Lyons (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/260,723

(22) Filed: Mar. 2, 1999

(30) Foreign Application Priority Data

Mar. 3, 1998 (FR) ................................. 98 02555

(51) Int. Cl.$^7$ .................................................. H01M 4/88
(52) U.S. Cl. .................. 502/101; 502/182; 502/184; 502/185; 502/325; 502/330; 502/334; 502/339; 502/344; 502/347; 427/181; 427/191; 204/242; 204/292
(58) Field of Search ..................... 502/182, 184, 502/185, 325, 330, 334, 339, 344, 347, 101; 427/181, 191; 204/242, 292

(56) References Cited

U.S. PATENT DOCUMENTS

| | | | |
|---|---|---|---|
| 4,115,322 | 9/1978 | Morcos | 252/447 |
| 4,407,905 | 10/1983 | Takeuchi et al. | 429/42 |
| 5,068,214 | * 11/1991 | Cordier et al. | 502/185 |
| 5,795,669 | * 8/1998 | Wilkinson et al. | 429/40 |

FOREIGN PATENT DOCUMENTS

| | | |
|---|---|---|
| 50300 | 4/1982 | (EP) . |
| 715889 | 12/1994 | (EP) . |
| 1077128 | 7/1967 | (GB) . |
| 1102725 | 2/1968 | (GB) . |

* cited by examiner

*Primary Examiner*—Bruce F. Bell
(74) *Attorney, Agent, or Firm*—Millen, White, Zelano, & Branigan, P.C.

(57) ABSTRACT

The invention relates to a stabilized bimetal catalyst comprising an electrically conductive support and a metallic deposited coating consisting of a first metal M1 chosen from platinum and silver and a second metal M2, different from the first and chosen from the group consisting of platinum, silver, gold, ruthenium, iridium, rhodium and osmium.

The invention also relates to a process for obtaining such a catalyst.

19 Claims, 1 Drawing Sheet

BIMETAL SUPPORTED CATALYST BASED ON PLATINUM OR SILVER, ITS MANUFACTURING PROCESS AND ITS USE FOR ELECTROCHEMICAL CELLS

SUMMARY OF THE INVENTION

The present invention relates to a stabilized bimetal supported catalyst based on platinum or silver, used in the electrodes for electrochemical cells.

More specifically, the invention relates to a bimetal supported catalyst based on platinum or silver, used for the electrodes of an electrolysis cell having a membrane and an oxygen-reducing cathode which produces a solution of alkali metal hydroxide and of chlorine by the electrolysis of an aqueous solution of an alkali metal chloride (NaCl, KCl).

Such an electrolysis cell generally consists of a cation exchange membrane which divides the cell into an anode compartment and at least one cathode compartment in which the said cathode is placed, the said compartment being supplied with an oxygen-containing gas.

The anode and cathode reactions in such electrolytic processes using an oxygen-reducing cathode are:
at the anode:

$$2Cl^- \rightarrow Cl_2 + 2e$$

at the cathode:

$$H_2O + \tfrac{1}{2}O_2 + 2e \rightarrow 2OH^-$$

In order to speed up the reactions occurring at the cathodes and to lower the reaction overvoltage in absolute value, catalysts are used, generally noble metals such as platinum, silver or gold, which are deposited on electrically conductive supports such as, especially, carbonaceous materials having a high specific surface area or metal substrates.

Preferably, platinum or silver is used, most particularly platinum since, although this is an expensive metal, it is the one which has the lowest value of cathode overpotential in absolute value.

The Applicant has observed, especially during periods when electrolysis cells like those mentioned above have stopped operating, that there is an agglomeration of platinum or silver particles on the support used. This has the effect of decreasing the "active" specific surface area of the catalyst, resulting in a loss of performance. In particular, an increase in the cell voltage is observed, resulting in increasing consumption of energy.

Tomantscheger et al. (J. Power Sources 1992, vol. 39 (1), pages 21–41) have observed when catalysts consisting of platinum particles supported on carbon are exposed to potassium that there is a significant agglomeration of the said platinum particles. The diameter of the Pt particles goes from 50 Å to 200 Å after approximately 48 hours' exposure to potassium at 80° C.

Pataki et al. (Electrochemical Soc. Meet., Toronto, Ont., May 12–17, 1985, Ext. Abstr. No. 659, pages 924–925) have shown that by pretreating a catalyst consisting of platinum particles supported on carbon with carbon monoxide (CO) there was a much smaller agglomeration of the said Pt particles when, as previously, the said catalyst was exposed to potassium.

The Applicant has now discovered that it is possible to decrease, or even eliminate the agglomeration of platinum or silver particles of supported catalysts by simultaneously depositing, on the support, when preparing the said catalyst, a first metal M1 chosen from platinum and silver and a second metal M2, different from the first and chosen from the group consisting of platinum, silver, gold, ruthenium, iridium, rhodium and osmium.

SUMMARY OF THE INVENTION

One subject of the present invention is therefore a stabilized bimetal catalyst comprising an electrically conductive support and a metallic deposited coating consisting of a first metal M1 chosen from a platinum and silver and a second metal M2, different from the first and chosen from the group consisting of platinum, silver, gold, ruthenium, iridium, rhodium and osmium.

Preferably, M2 is platinum, silver or ruthenium.

According to the present invention, the mass ratio M1/M2 of the metals M1 and M2 of the metallic deposited coating is at least equal to 1 and preferably between 1 and 20.

According to the present invention, carbonaceous materials, such as graphite, furnace black, carbon black or carbon powder, having specific surface areas of at least 50 m²/g and preferably between 100 and 600 m²/g, will be used as the electrically conductive support. These carbonaceous materials may be pretreated, especially in order to create functional groups on the surface of the carbonaceous material.

By way of illustration of such carbonaceous supports, mention may be made of the graphite called TIMCAL HSAG-300 having a specific surface area of 360 m²/g, Sibunit 5 which is a carbon having a specific surface area of 360 m²/g, and the carbon VULCAN XC-72R which is a furnace black having a specific surface area of 300 m²/g.

The bimetal catalyst of the present invention may be prepared by a co-reduction of mixtures of reducible metal salts using a process which consists in simultaneously impregnating, in a solvent medium, the electrically conductive support with a solution of a metal salt of the first metal M1, chosen from platinum and silver, and with a solution of a metal salt of the second metal M2, different from the first, chosen from the group consisting of platinum, silver, gold, ruthenium, iridium, rhodium and osmium; in slowly evaporating to dryness, with stirring and with an inert-gas sparge, the suspension consisting of the solutions of the metal salts of the metals M1 and M2 and the carbonaceous support; in drying the powder obtained, under atmospheric pressure, at a temperature of between 60° C. and 80° C. and then, under a reduced pressure, at a temperature of between 90° C. and 110° C.; in subjecting the dried powder obtained to a stream of hydrogen, at temperatures ranging from 300° C. to 600° C., achieved at a rate of temperature rise of between 0.2° C. and 1.5° C. per minute and preferably ranging from 0.2° C. to 1° C. per minute, and then in stopping the heating or else in holding the temperature obtained for a time of at most 20 hours and preferably for a time of between 2 hours and 16 hours.

Preferably, alcoholic or aqueous/alcoholic solutions of the metal salts of the metals M1 and M2 are used. The preferred alcohol is ethanol. The concentrations by weight of the metal salts of the metals M1 and M2 of the said solutions may vary over a wide range. They may range from a few grams to a few tens of grams of salts per liter. They are calculated in such a way that, when the said solutions containing the salts of metals M1 and M2 are mixed, a mass ratio M1/M2, of the metals M1 and M2 to be simultaneously deposited on the support, at least equal to 1, and preferably between 1 and 20, is obtained.

Next, having produced the mixture of the said solutions, a carbonaceous support and an impregnation solvent, such as benzene or toluene, in an amount of at least 10 ml of solvent per gram of support, are introduced into the said mixture and then the suspension obtained is held for a few days at ambient temperature with stirring and with a nitrogen sparge. This allows the solvents to evaporate and the support to be perfectly impregnated by the metal salts.

Next, the powder obtained is firstly dried at atmospheric pressure at a temperature of between 60° C. and 80° C., preferably at a temperature close to 70° C., and then at a reduced pressure at a temperature of between 90° C. and 110° C., preferably at a temperature close to 100° C.

At this stage, the support is impregnated by the salt of M1 and the salt of M2. Next, the cations are reduced in a stream of hydrogen.

The stability of the bimetal catalysts of the present invention which are thus obtained is tested. For this purpose, they are put into suspension in alkaline solutions at temperatures of between 60C and 90° C. and exposed to a stream of oxygen for several hours, or even several days.

The change in the size of the particles of M1 and in the metallic deposited coating consisting of M1 and M2 is monitored, before and after the treatment, by X-ray diffraction.

This method of analysis makes it possible to state that a stabilized bimetal supported catalyst is obtained.

This is because the particles of metal M1 no longer build up when they are deposited on a support simultaneously with particles of a metal M2, different from metal M1.

The bimetal supported catalysts, stabilized according to the present invention, may be used for electrochemical cells.

These catalysts may especially be used in the production of electrodes for electrolysis cells having an oxygen-reducing cathode.

The platinum- or silver-based bimetal catalysts of the present invention have the advantage of holding the mass activity, defined as the reduction current per unit mass of catalyst, constant over time or else of keeping the specific activity of the catalyst, i.e. the reduction current per unit area of active surface, constant.

DETAILED DESCRIPTION OF THE INVENTION

Figure 1:
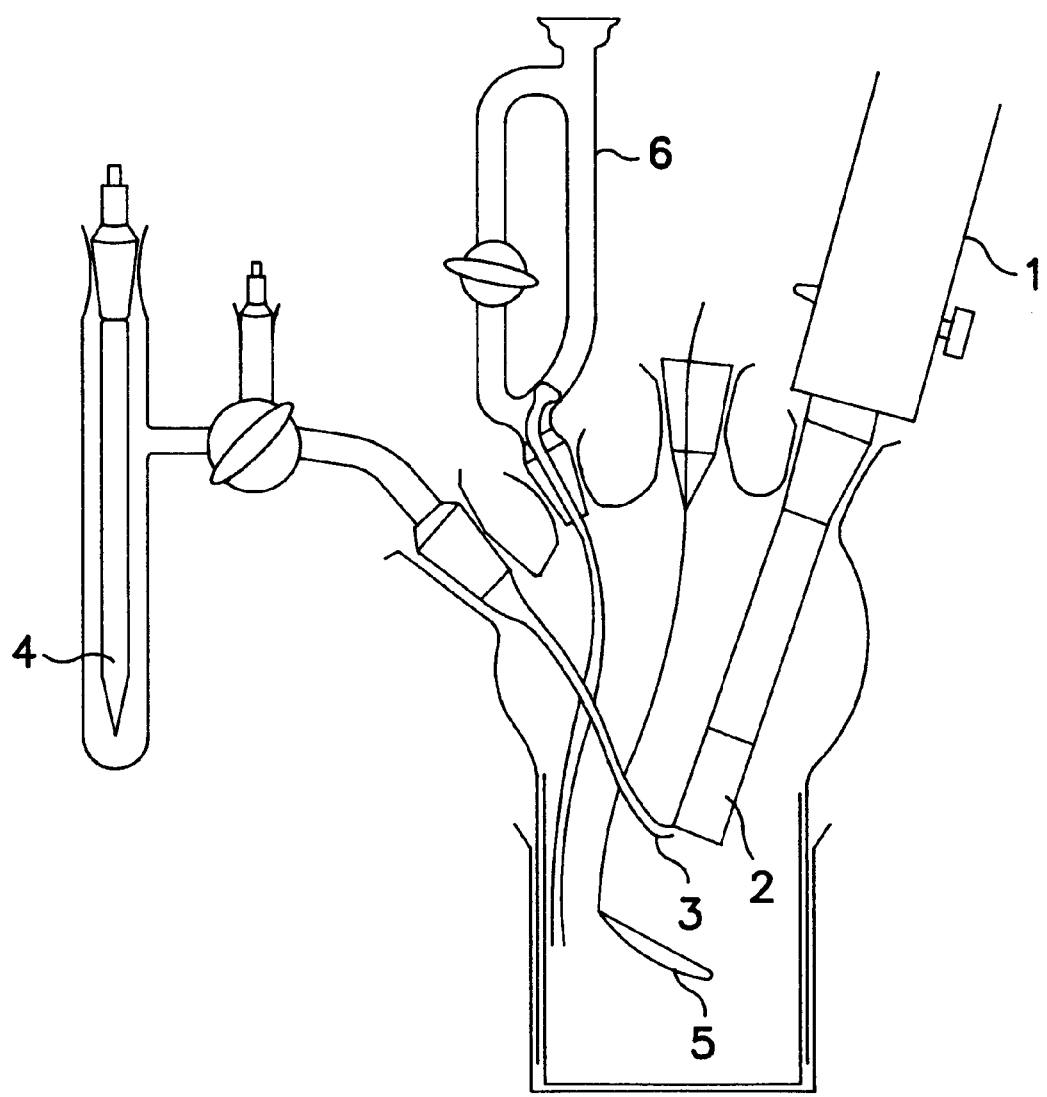
FIG. 1 shows the electrode of the invention inserted into an electrolysis cell.

The following examples illustrate the invention.

EXAMPLES

Preparation of the Catalysts:
Materials used:
Carbonaceous support:
    VULCAN XC-72R carbon is a reference support. This is a furnace black having a specific surface area of approximately 300 m$^2$/g, of which 120 m$^2$/g corresponds to microporous surface and 88 m$^2$/g to mesoporous surface.
Metals
    The two metals used are platinum and silver. The platinum is in the form of an aqueous H$_2$PtCl$_6$ solution containing 85.5 g of Pt per liter. The silver is in the form of (solid) AgNO$_3$.

Alcohol used for the alcoholic or aqueous/alcoholic solutions of the metal salts
    Absolute ethanol (99.85%)
Impregnation solvent
    Toluene (99.90%).
Preparation of the catalysts according to the invention:
    This preparation was carried out on (unoxidized) VULCAN, using the quantity of metal salt necessary for simultaneously depositing mass contents of metal M1 and of metal M2 respectively equal to 10% on the support. In order to prepare a platinum catalyst (catalyst P), the suitable quantity of an aqueous H$_2$PtCl$_6$ solution (82.5 Pt/l) in ethanol is poured into a beaker. For a silver-based catalyst (catalyst A), a suitable quantity of solid AgNO$_3$ is weighed out and dissolved in ethanol. For an Ag +Pt catalyst (catalyst AP), the two metal salt solutions are combined to obtain a Pt/Ag mass ratio equal to 1.
    Next, 4 g of VULCAN support and 40 ml of toluene are added. This suspension is left to stand, with stirring and with a nitrogen sparge, for 10 days at room temperature, thereby resulting in the evaporation of the solvents. The powder thus obtained is dried for 24 h at 85° C. in air and then for 24 h at 100° C. under reduced pressure.
    At this stage, it is in the form of a platinum II and/or silver I salt deposited on the carbonaceous support. These cations are then reduced by a stream of hydrogen according to the procedure below.
    The specimen is heated, at an average rate of temperature rise of 1° C. per minute, to 500° C. This temperature is then maintained for 16 hours.
    The catalysts prepared according to the abovementioned process were characterized by wide-angle X-ray diffraction (powder method) using a BRUKER AXS D5000 diffractometer. The diffractometer is equipped with a copper-anode tube and with a Si(Li) solid detector cooled by the Peltier effect.
    We use the diffractograms to evaluate the average size of the metal crystallites deposited on the carbonaceous supports. In our case, we use the (111) and (220) lines of the metal (platinum and silver), the breath of half intensity maximum β of which is determined. The half-maximum breath is obtained after modelling the line in question with the aid of a pseudo-Voigt function, after subtracting the continuous background and taking in account possible peaks overlapping the one measured (Profile/Diffrac-At software on a PC). Care is taken to work in thin-film mode ($\approx$220 $\mu$m) and to correct the measured width for the intrinsic broadening introduced by the diffractometer. The average crystallite size D (in nm), in the direction perpendicular to the crystallographic planes in question, is then obtained using the Scherrer equation:

$$D=0.9\times\lambda/(\beta_c\times\cos\theta)$$

where $\beta_c=(\beta^2-\beta_o^2)^{1/2}$
$\lambda=0.15418$ nm
β(in rd): the half-maximum line breath of the metal analyzed,
$\beta_o$ (in rd): the half-maximum line breath of a perfectly well-crystallized standard, this line being close to the line of the metal analyzed,
θ: the Bragg angle.
This measurement has a comparative value. It serves to estimate the effect of the treatment on the average crystallite size. The uncertainty in this measurement is approximately 10 to 20%, due to the background noise and to the errors on the baseline and on the estimation of the width of the base of the peak (limits of the integration).

To test the stability of the catalysts, the following device will be used.

Six reactors in series, made of PFA (perfluoroalkoxy polymer), are supplied with oxygen in parallel. 90 ml of 50% sodium hydroxide and 0.5 g of catalyst are poured into each reactor, to which a bar magnet is added. Next, the reactors are placed in an oil bath. Each reactor is supplied with oxygen and the temperature of each is regulated at 90° C. by means of the oil bath and a contact thermometer. The oxygen flow rate is greater than 4 bubbles per second. The treatment lasts 100 hours. After the treatment, the specimens are vacuum-filtered (water pump) on a Millipores system, using filters made of PTFE rendered hydrophilic. They are rinsed 3 times with 10 to 20 ml of demineralized water. Next, they are dried in an oven for 48 hours at 85° C. and then for 24 hours at 100° C. in an oven under reduced pressure.

Catalyst A, catalyst P (which are not according to the invention) and catalyst AP (according to the invention) were tested:

- A: catalyst based only on silver: 10% silver deposited on VULCAN,
- P: catalyst based only on platinum: 10% platinum deposited on VULCAN,
- AP: catalyst according to the invention, containing 10% platinum and 10% silver deposited at the same time on VULCAN.

The characteristics, determined by X-ray diffraction, before and after exposure to 50% sodium hydroxide at 90° C. for 100 hours are given below.

Catalyst P (not according to the invention)
Crystallized species before treatment:
Pt:

- (111) line, $I_{L^*}$=100: D=5 nm
- (220) line, $I_L$=25: D=4.5 nm

[*$I_L$ means the Intensity of the line]
Unit cell dimension a=3.9213 Å
Crystallized species after treatment:
Pt:

- (111) line, $I_L$=100: D=12 nm
- (220) line, $I_L$=25: D=9.5 nm unit cell dimension a=3.9213 Å
A considerable agglomeration of the Pt crystallized species is observed.

Catalyst A (not according to the invention):
Crystallized species before treatment:
Ag:

- (111) line, $I_L$=100: D=80 nm
- (220) line, $I_L$=25: D=25 nm.

Crystallized species after treatment:
Ag:

- (111) line, $I_L$=100: D=120 nm
- (220) line, $I_L$=25: D=50 nm.

A considerable agglomeration of crystallized species of silver is observed.

Catalyst AP (according to the invention):
Crystallized species before treatment:
High Pt-content alloy: Pt/Ag solid solution containing 11 At.percent silver:

| (111) line | D = 4.5 nm |
|---|---|
| (220) line | D = 4 nm |

(a=3.9410 Å).
High Ag-content alloy: Ag—Pt solid solution containing approximately 23 At.percent platinum:

| (111) line | D = 12.5 nm |
|---|---|
| (220) line | D = 7.9 nm. |

Both species (Pt—Ag and Ag—Pt solid solutions) crystallized on the VULCAN carbon are present, and are distinguished by their respective Ag and Pt contents, knowing that, on the VULCAN carbonaceous support, there is a Pt/Ag mass ratio equal to 1 (10% platinum by weight and 10% silver by weight).
Crystallized species after treatment:

| Pt—Ag solid solution: | (111) line | D = 4.9 nm |
|---|---|---|
| | (220) line | D = 3.8 nm |
| Ag—Pt solid solution: | (111) line | D = 12.7 nm |
| | (220) line | D = 7.2 nm. |

No agglomeration is observed.
Determination of the Activity of the Catalysts with Respect to the Reduction of Oxygen in Alkaline Medium:
Preparation of the electrode for the activity measurements:

A suspension is prepared by mixing the catalyst powder, ultrapure water and ethanol. This suspension is then homogenized by ultrasonic stirring for 2 hours. A PTFE suspension is added to this mixture and the final mixture is again ultrasonically homogenized.

An end-piece made of glassy carbon is firstly polished with diamond paste (down to 1 nm) and ultrasonically rinsed, in succession, in acetone, ethanol and ultrapure water for 15 minutes. It is then dried in an oven. 10 µl of the final suspension are then deposited using a microsyringe onto the glassy carbon end-piece. It is then dried overnight at room temperature, and then for 15 minutes in an oven at 200° C. in order to establish the mechanical integrity of the coating. The electrode thus obtained is fitted into the cell shown in FIG. 1.

The cell is composed of a rotating-disc electrode (1) onto which the end-piece (2), prepared beforehand, is fitted, of a Luggin capillary (3) connected to the reference electrode (4), of a platinum counterelectrode (5) and of a sparger (6) for supplying oxygen. The rotating electrode (1), the reference electrode (4) and the counterelectrode (5) are connected to a potentiostat (not shown in FIG. 1).
Activity measurements:

The platinum active surface area of the electrode is determined from the trace of a cyclic voltammetry curve in (superpure) 1M $H_2SO_4$ medium in a nitrogen (argon) atmosphere over the hydrogen adsorption/desorption range. Next, the electrode is placed in a similar cell containing 1 mol/l of sodium hydroxide made from superpure MERCK sodium hydroxide and ultrapure water. The temperature of the cell is fixed at 25° C. Oxygen is bubbled into the sodium hydroxide for several minutes before starting the tests so as to saturate the sodium hydroxide with dissolved oxygen. Next, a potential sweep between +0.1 V (Hg/HgO) and −0.6 V (Hg/HgO)

is carried out at 1 mV/s and for various rotation speeds of the rotating electrode (500, 1000, 2000 and 4000 rpm) and the observed current for a potential of −60 mV (Hg/HgO) is recorded for the various electrode rotation speeds. From these current values and from this active surface area of the catalyst, and by using the Levich equation and the Fick law under steady-state conditions, it is possible to determine $i_k$, namely the current density relative to the intrinsic activity of the catalyst, for a potential of −60 mV (Hg/HgO). ("Electrochemistry: principles, methods and applications", A. J. Bard and C. R. Faulkner, Published by MASSON, 1983, Chapter 8).

Results:

Catalyst P is thus evaluated. An active surface area of 14.6 cm$^2$ is measured and an $i_k$ of 0.76 mA for a potential of −60 mV (Hg/HgO) is determined, i.e. a specific activity of 52 $\mu$A/cm$^2$.

The catalyst AP is evaluated in an equivalent manner. Its active surface area is 15.9 cm$^2$ and the $i_k$ is 0.87 mA, i.e. a specific activity of 55 $\mu$A/cm$^2$.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding French application No. 98.02.555, filed Mar. 3, 1998 is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A stabilized bimetal catalyst comprising an electrically conductive support and a non-continuous metallic deposited coating comprising a first metal M1 which is platinum or silver and a second metal M2, different from the first which is platinum, silver, gold, ruthenium, iridium, rhodium or osmium.

2. The catalyst according to claim 1, wherein the electrically conductive support is a carbonaceous material having a specific surface area of at least 50 m$^2$/g.

3. The catalyst according to claim 2, wherein the carbonaceous material has a specific surface area of between 100 m$^2$/g and 600 m$^2$/g.

4. The catalyst according to claim 1, wherein M1 is platinum and M2 is silver.

5. The catalyst according to claim 1, wherein M1 is silver and M2 is platinum.

6. The catalyst according to claim 1, having a mass ratio M1/M2 of the metals M1 and M2 of the metallic deposited coating at least equal to 1.

7. A process for obtaining a bimetal catalyst according to claim 1, comprising simultaneously impregnating, in a solvent medium, the electrically conductive support with a solution of a metal salt of the first metal M1, and with a solution of a metal salt of the second metal M2, and evaporating to dryness, with stirring and with an inert-gas sparge, the suspension of the solutions of the metal salts of the metals M1 and M2 and the carbonaceous support to obtain a powder; drying the powder obtained under atmospheric pressure at a temperature of 60° C. to 80° C. and, under a reduced pressure, at a temperature of 90° C. to 110° C.; subjecting the dried powder obtained to a stream of hydrogen, at temperatures of 300° C. to 600° C., achieved at a rate of temperature rise of between 0.2° C. and 1.5° C. per minute, and then stopping the heating or holding the temperature obtained for a time of at most 20 hours.

8. The process according to claim 7, wherein the solutions of the metal salts of the metals M1 and M2 are alcoholic or aqueous/alcoholic solutions.

9. The process according to claim 7, wherein the concentrations by weight of the solutions of the metal salts of the metals M1 and M2 are such that a mass ratio M1/M2 equal to 1is obtained.

10. The process according to claim 7, wherein the impregnation solvent is toluene.

11. The process according to claim 7, wherein the concentrations by weight of the solutions of the metal salts of the metals M1 and M2 are such that a mass ratio M1/M2 equal to 1 to 20 is obtained.

12. A process for the production of electrodes for electrochemical cells, comprising depositing a catalyst according to claim 1 on a support.

13. The process according to claim 11, wherein the electrochemical cell is an electrolysis cell having an oxygen-reducing cathode.

14. A process according to claim 12, further comprising preparing an electrochemical cell, by placing said electrode in an electrolysis cell having an oxygen-reducing cathode.

15. The catalyst according to claim 1, having a mass ratio M1/M2 of the metals M1 and M2 of the metallic deposited coating of 1 to 20.

16. A process for obtaining a bimetal catalyst according to claim 1, comprising simultaneously impregnating an electrically conductive support with a solution of a metal salt of first metal M1 and second metal salt M2.

17. A process for obtaining a bimetal catalyst comprising an electrically conductive support and a metallic deposited coating comprising a first metal Ml which is platinum or silver and a second metal M2, different from the first, which is platinum, silver, gold, ruthenium, iridium, rhodium or osmium, comprising simultaneously impregnating an electrically conductive support with a solution of a metal salt of first metal M1 and second metal salt M2.

18. A stabilized bimetal catalyst comprising an electrically conductive support and a metallic deposited coating comprising a first metal M1 which is platinum or silver and a second metal M2, different from the first which is platinum, silver, gold, ruthenium, iridium, rhodium or osmium, having a mass ratio M1/M2 of the metals M1 and M2 of the metallic deposited coating at least equal to 1.

19. The catalyst according to claim 18, having a mass ratio M1/M2 of the metals M1 and M2 of the metallic deposited coating of 1 to 20.

* * * * *